R. H. ROSENBERG.
AXLE FOR AUTOMOBILES.
APPLICATION FILED FEB. 14, 1912.
1,137,287.
Patented Apr. 27, 1915.
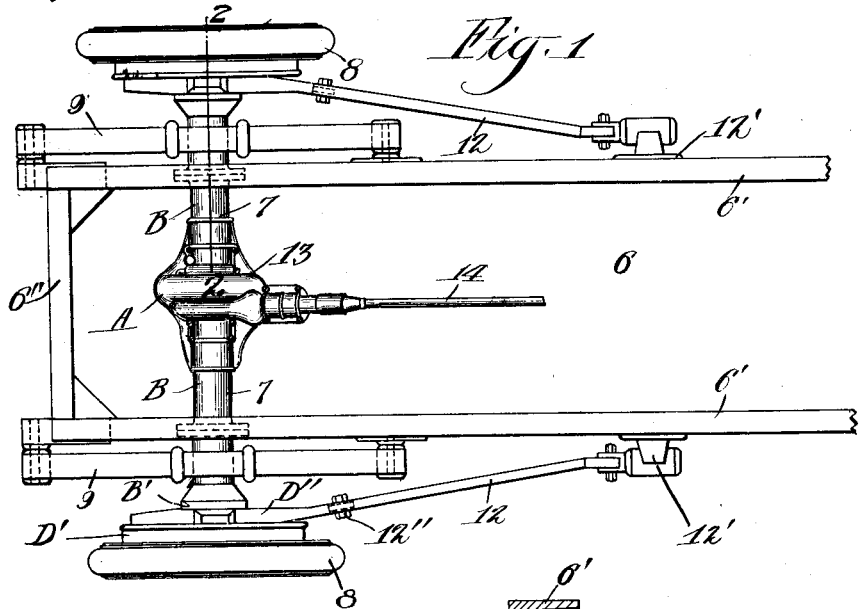
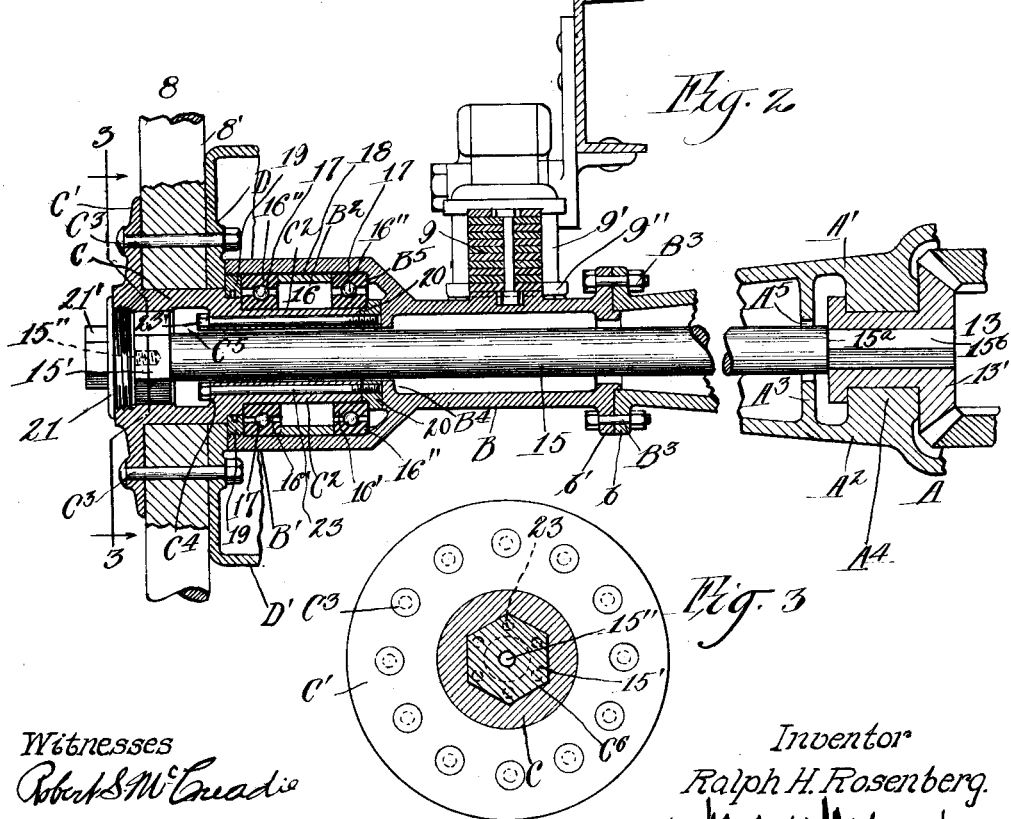
Witnesses
Robert S. McCreadie
F. M. Davis
Inventor
Ralph H. Rosenberg.
by Hannay & Spellman
Attys.

UNITED STATES PATENT OFFICE.

RALPH H. ROSENBERG, OF COLUMBUS, OHIO, ASSIGNOR TO THE KINNEAR MANUFACTURING COMPANY, OF COLUMBUS, OHIO, A CORPORATION OF WEST VIRGINIA.

AXLE FOR AUTOMOBILES.

1,137,287.   Specification of Letters Patent.   Patented Apr. 27, 1915.

Application filed February 14, 1912. Serial No. 677,557.

*To all whom it may concern:*

Be it known that I, RALPH H. ROSENBERG, a citizen of the United States, and a resident of Columbus, county of Franklin, and State of Ohio, have invented certain new and useful Improvements in Axles for Automobiles, of which the following is a specification.

My invention relates to improvements in automobiles and has particular reference to improvements in driving axles for such vehicles.

The object of my invention is to improve and simplify the construction of axles of the type mentioned to the end that they shall be more durable, absorb less power in operation, be cheaper to manufacture; and the parts of which shall be so associated and arranged that they can be quickly and easily assembled and taken apart.

A further object is to provide a driving axle of unique construction for resilient connection with the frame of the automobile and which shall have a driving shaft connecting the road wheel with the driving gearing, positioned within a housing, free of all working friction and subject only to torsional stresses.

A further object of my invention is to provide a driving axle which shall have a rotatable wheel-driving shaft mounted within a hollow fixed casing so arranged that it shall be free to be withdrawn from the casing without disturbing the driving gears or wheel.

My further purpose is to provide a driving axle for heavy vehicles which shall support the load directly upon the wheels through the medium of antifriction bearings housed within a rigid casing or housing and which shall leave the driving shaft free of all except driving or rotating stresses.

A further object of my invention is to provide an axle of the floating type, the load carrying antifriction bearings of which shall be arranged closely adjacent to the load line of the road wheel and within the hollow fixed axle and which shall eliminate the outer hub extensions usual in this form of construction.

My invention consists in a fixed hollow axle containing a rotatable driving shaft adapted and arranged to transmit power from the differential gears contained in the axle to the hub of the driving wheel, said shaft being engaged and supported at its ends only and being rotatably connected with and easily removable from the coöperating members.

My invention further consists in an automobile driving axle having the above characteristics and in which the hub of the wheel extends within the outer end of the stationary axle and is rotatably supported therein free of the shaft.

My invention further consists in the various constructions and the combinations of elements and parts by which the above and other objects are attained and all as hereinafter described and particularly pointed out in the claims.

Floating axles have been devices to reduce running friction as much as possible, but they have so far proven of doubtful expediency, as their inherent complexity of construction, as hitherto made, has increased rather than diminished their cost and need for care and attention.

Axles which embody my invention not only preserve the desirable features but also result in a simple and strong construction which requires little care or attention and which provides bearings of ample load carrying capacity arranged in efficient load sustaining relation to the wheel without the extending hubs which have been a feature of floating axle constructions.

My invention will be more readily understood by reference to the accompanying drawings which form part of this specification, and in which:

Figure 1 is a plan view of the rear end of an automobile chassis equipped with a driving axle embodying my invention in its preferred form; Fig. 2 is an enlarged longitudinal central section on the line 2—2 of Fig. 1, showing substantially half or one end only of the driving axle; and Fig. 3 is a detail vertical section, on the line 3—3 of Fig. 2, showing the separable engagement between the outer end of the driving shaft and the wheel hub.

In the drawings illustrating my invention, I have shown only the rear portion of the chassis, the frame 6 whereof comprises side bars 6′ and cross bars 6″. The front of the frame is broken away and only the rear cross bar is shown. I provide for resiliently mounting the rear end of the frame on a rigid hollow driving axle 7 by means of half elliptical springs 9 which I pivot at their opposite ends to the sides of the frame and which rest between their ends upon the axle 7. These springs are rigidly secured and clamped to the axles by means of U shaped clamping bolts 9' which straddle the springs and bolt them to spring pads 9'' carried by the axle. The driving axle is supported at its outer ends by driving wheels 8. I form the said axle 7 with a gear case A in its central part for housing a differential gearing 13. For transmitting rotative power from the differential 13 to the driving wheels I provide a pair of torsion axles or driving shafts 15.

For the purpose of securely holding the spring connected axle 7 in a fixed transverse position with respect to the frame 6 and to prevent the same from vibrating or springing backward and forward from its normal position, I provide forwardly extending braces or radius rods 12 which I pivot at their forward ends to the side bars 6' as shown at 12' and rigidly secure at their rear ends, as shown at 12'', each to the brake part D'' mounted upon the outer end of the axle.

The shaft 14 operatively connects the differential gearing with the engine (not shown) in the forward part of the chassis. I construct the said axle 7 as a sectional casing preferably of a central part A and two end parts B adapted to be securely fastened together when assembled for use. The central part or section A is enlarged at its middle portion to provide a housing for the differential gear and consists of an upper part A' and lower part A² having close fitting edges and adapted to be securely bolted together. The outer ends of this central part are provided with flanges $b$ for connection to similar flanges $b'$ provided on the inner ends of the end parts or sections B. These flanges are secured together by bolts B³. The outer ends of the end sections B are formed to accommodate the large load carrying bearings which I provide for mounting the driving wheels upon the axle.

In order to most effectually attain the objects sought, I provide the hub of the wheel with a central inwardly extending nozzle or portion which I project within the outer end of the fixed or rigid axle 7. For this purpose I enlarge the outer end of the portion B of the rigid axle sufficiently to receive the hub and also a set of anti-friction bearings 16 therein, and I provide the wheel with a hub which comprises a hollow inner casing C, the inner end C² of which projects a considerable distance within the outer end of the rigid axle 7.

I mount the wheel proper upon the hub by means of an outer fixed annular flange C' in which the outer end of the hub terminates and an inner movable flange D carried on the hub. These flanges are opposed to each other and are separated sufficiently to receive the spokes 8' between them. I clamp the wheel firmly in place by drawing the flanges toward each other upon the spokes by the through bolts C³ which are circumferentially spaced around the outer edge of the two flanges. The inner flange D carries the brake rim D' preferably formed integrally therewith.

For the purpose of providing a suitable space within which to place antifriction bearings, I enlarge the outer ends B' of the hollow axle 7 providing a cylindrical chamber B² in each end of the axle. The antifriction bearings 16 are interposed between the hub extension C² and the fixed axle and serve to mount the wheel upon or within the axle housing. The anti-friction bearings illustrated consist of two ball bearings, one arranged at each end of the enlargement B² and each comprises an inner grooved ring 16' and an outer grooved ring 16'' with a plurality of bearing balls 17 arranged between them in the grooves thereof. The balls in each case serve to prevent the relative displacement of the two grooved rings longitudinally of the axle. The bearings 16 are spaced apart sufficiently to secure a proper mounting for the wheel, and they are held separated by a spacing ring 18 arranged between the two outer rings of each pair of grooved rings. The inner bearing is securely held against an inner soulder B⁵ provided at the inner end of the enlargement B', and the antifriction bearing as a whole is retained in place by means of an externally threaded clamping ring 19 screwed into the outer end of the enlarged end B' of the hollow axle and which when screwed into place forces the bearing rings firmly against the shoulder B⁵.

In order to hold the hub in place within these bearings, I provide a hub anchoring or holding ring 20 which fills a space provided therefor between a shoulder B⁴ formed at the inner end of the bearing chamber B² and the inner ball bearing. I extend the outer or forward side of this ring 20 within the inner bearing ring forming an annular dowel 20' which retains the ring 20 centrally in position when the wheel is removed. This shoulder ring is provided with a central hole large enough to accommodate the driving axle 15 and to be entirely free thereof. I make the hub extension C² of sufficient length to reach the outer surfaces of the dowel portion 20' of the ring 20 when the wheel is mounted in place upon the axle, in which position of parts the outer end of the enlargement B' is substantially in contact with the inner face of the flange D. I secure the hub of this holding ring by means of long bolts 23 which extend longitudinally through the hub in holes provided therefor and having threaded ends which screw into correspondingly threaded holes provided in the ring 20. The outer end of the hub is provided with a central cavity or chamber $C^5$ having an inner radial wall or shoulder $C^4$ providing a seat for the heads 23' of the bolts 23.

The live axle or driving shaft 15 extends from the differential gearing outward through the hollow axle into the hub of the wheel and I form it at its ends for separable connection with both the gearing and the wheel. This axle serves to drive or rotate the wheel by power received from the gearing. It floats upon its ends, or in other words it has no other contact with any part of the axle. It is consequently entirely free of all strain except the torsional strain necessary to drive the vehicle. The inner end $15^b$ is preferably square and enters a central square hole provided in the hub of the gear 13' which is one member of the differential gearing 13. This gear is held against longitudinal movement by suitable shoulders and is centrally mounted in a bearing $A^4$ provided in the casing, so that when the shaft is withdrawn the gear remains mounted in its proper position.

The outer end 15' of the shaft 15 is enlarged to fill the chamber $C^5$ provided in the hub and is preferably made polygonal in shape for convenient rotative connection with the hub. In the drawing the head is shown as hexagonal in shape and the inner periphery of the chamber $C^5$ is provided with a hexagonal opening $C^6$ to substantially fit the head 15'. The fit of the shaft in the hub and the gear is such that the shaft may be freely withdrawn or inserted when desired. The shaft is held against endwise movement when in place, by a shoulder $15^a$ at its inner end which contacts with the hub of the gear 13' and by a hub nut 21 which is screwed into the outer end of the hub C. The shaft is provided with a threaded hole 15'' in its outer end for the insertion of a tool by which the shaft can be withdrawn from the axle.

The bearings, wheel and driving shaft at each end of the axle 7 are assembled as follows: The anchoring ring 20 is first assembled with its dowel flange inserted within the inner ring of the innermost bearing. This anchoring ring and the bearing rings and balls associated therewith are then inserted together into the chamber $B^2$ with the anchoring ring 20 abutting against the shoulder $B^4$. The spacing ring 18 is next inserted into the chamber $B^2$ adjacent to the innermost bearing. The outer bearing is then inserted and pressed closely against the spacing ring. The aforesaid members are then clamped securely in place by the ring 19. The driving wheel is mounted by inserting the projecting hub portion $C^2$ into the axle chamber $B^2$ through the ball bearings 16 with its inner end abutting against the anchoring ring 20 to which it is then secured by means of the bolts 23. The driving shaft 15 is then inserted longitudinally into the axle through the hollow hub C and the axle frame 7 into place with its squared end $15^b$ inserted in the gear 13' and the hexagonal head 15' within the hexagonal opening $C^6$, and the shaft is retained in position by the hub nut 21.

In order to facilitate the insertion of the shaft, I provide a guide hole $A^5$ adjacent to the gear 13' through which to insert the inner end of the shaft and which guides the inner end of the shaft into the square hole in the hub of the gear 13'. This hole is provided in a cross wall or partition $A^8$ which is arranged adjacent to the differential gearing.

It is to be noted that ample clearance is provided all along the shaft especially in the hole $A^5$ and in the hub C where the shaft passes through it so that the flexure which a structure of this kind might be subject to under the severe strains it has to stand in operation, will not frictionally engage the shaft with any surface between its ends and will not subject it to any flexure itself which might cause undue or unnecessary friction.

It will now be clear that my invention embodies the desirable features which I have sought to attain including a driving axle for automobiles in which the load stress is transmitted directly from the wheel to a stationary housing axle through anti-friction bearings mounted and housed within the projecting end of the axle, in which the wheel parts can be easily and readily assembled and taken apart, and in which the driving power is transmitted to the wheel through a floating driving shaft which can not be subjected to any but torsional stresses and which may be readily removed from the fixed axle and wheel.

As many modifications of my invention will readily suggest themselves to one skilled in the art to which it appertains, I do not limit or confine my invention to the specific structures herein shown and described.

Having thus described my invention I claim as new and desire to secure by Letters Patent:

1. In a driving axle for motor vehicles, the combination of a non-rotatable hollow axle casing, a road wheel having a hub which extends within the outer end of said casing, means for rotatably mounting the wheel therein, detachable means for preventing its free withdrawal therefrom, a driving shaft extending through said hub without contact with the inward extension thereof and through said casing, a driving gear carried by the casing with which the inner end of the shaft is freely separably connected, and means for rotatably connecting the outer end of the shaft with the hub of the wheel, said shaft being freely removable through the hub without disturbing the wheel or driving-gear.

2. In a driving axle for motor vehicles, the combination of a hollow non-rotatable member, a road wheel at the outer end thereof and having an inwardly extending hub adapted to be rotatably mounted within the outer end of said member, a driving shaft extending through said hub and said hollow member and supported by and connected with said hub at its outer end to rotate said wheel, and driving mechanism carried by the axle with which the inner end of said shaft is connected, said shaft being free to be drawn from said mechanism without disturbing said mechanism or said wheel.

3. In a driving axle for motor vehicles, the combination of a hollow stationary member, a road wheel having a hub extension projecting within the outer end of said member, antifriction bearings within said member and within which said hub is rotatably mounted, a collar within said member to which the hub is secured and by which it is held against removal from the member, and a drive shaft rotatably mounted within the axle and having operative connection with the hub of the road wheel.

4. In a driving axle for motor vehicles, the combination of a non-rotatable hollow axle member, a road wheel rotatably mounted therein, said wheel having a hub extension projecting within the outer end of the axle, an antifriction bearing removably mounted within the axle and upon which the wheel rotates, a ring removably secured within the outer end of the axle and adapted to retain the said bearing against free removal, a collar arranged within the axle at the inner end of said bearing, means removably securing the hub of the wheel to said collar whereby said wheel is retained against free removal, and a drive shaft within said axle having separable connection with the wheel hub and by which the wheel is driven.

5. In a driving axle for motor vehicles, the combination of a non-rotatable hollow member carrying drive gears between its ends, a road wheel having a central hub portion adapted to project within the outer end of the hollow member, an antifriction bearing mounted within the outer end of the hollow member and upon which the wheel is rotatably mounted, a separable collar secured to the inner end of the hub and by which the wheel is held against free removal from the axle, bolts extending through the hub for securing said collar thereto, an enlarged central chamber in the outer end of the hub for accommodating the heads of said bolts, a drive shaft extending through said hub and said casing having separable connection at its inner end with said gearing and having a polygonal shaped head on its outer end, the periphery of said chamber being similarly formed to receive said head and by which said shaft is rotatably connected with the wheel, and means for preventing the free removal of the shaft from the axle.

6. In a motor vehicle, the combination of a fixed hollow axle containing driving mechanism in its central portion and an antifriction bearing in one of its ends, a road wheel rotatably mounted in said bearing, a driving shaft supported at its ends only within said hollow axle and operatively connecting the driving mechanism and the wheel in the plane of its spokes, said driving shaft being freely removable from the axle through a central opening in the hub of the wheel and a removable cap closing said opening and retaining the shaft in said position.

7. In a motor vehicle a driving axle comprising in combination a rigid hollow casing extending transversely from side to side of the vehicle, said casing having an enlarged cylindrical outer end adapted to receive the hub of a driving wheel for rotation therein, a driving wheel having a hub adapted to extend into the said enlarged end of the casing, anti-friction bearings at each end of the hub containing portion of said casing, means to hold said bearings spaced apart, means attachable to the outer end of the axle for securing said bearings in the casing, anchoring means engaging the rear of the innermost of the bearings, and attaching means to anchor the hub to said anchoring means to hold said wheel in place.

8. In a motor vehicle, the combination of a rigid hollow axle having a cylindrically chambered end portion, a pair of ball bearings spaced apart therein, a road wheel having a projecting hub formed to fit rotatively within said bearings, a threaded locking ring detachably engaging the outer end of the axle chamber to secure the bearings in place, an anchoring ring lying back of said bearings within said axle, and means for fastening the wheel to said anchoring ring to prevent withdrawal of the hub from the bearings.

9. In a motor vehicle, the combination of a driving axle consisting of a rigid hollow casing having a cylindrically chambered outer end, ball bearings in said outer end, a wheel having an inwardly projecting hub extending within said chambered axle and rotatively held by said bearings, means to prevent the withdrawal of the hub from the axle, and a rotary driving shaft lying within the axle and hub and directly engaging the outer end of the hub for driving the wheel.

10. In a motor vehicle, the combination of a rigid hollow driving axle having an enlarged outer end portion having a cylindrical chamber therein, ball bearings in said chamber, a wheel having an inwardly projecting hub extending within said bearings, means to hold said hub in operative relation to said bearings, a rotary driving shaft having its outer end rotatively engaging the hub of said wheel and adapted to move transversely therein, and means carried by the outer end of said hub retaining the shaft in position.

11. In a motor vehicle, the combination of a fixed hollow driving axle having a cylindrically chambered enlarged outer end, a ball bearing ring fitting therein adjacent to its inner end, a ball bearing ring spaced apart therefrom, a spacing ring separating said ball bearing rings, an inner ball bearing ring lying concentrically within each of the first said rings, said concentric rings having their opposing surfaces centrally and concentrically grooved for the reception of suitable antifriction means, balls operatively mounted in the grooves of said rings, a holding ring definitely engaging the inner surface of the outer end of said chamber and securing said ball bearing rings in place, an anchoring ring lying adjacent to the inner end of said chamber and rotatable therein, said ring being formed to lie partly back of the innermost ball bearing ring and partly within the same and in engagement therewith, a driving wheel having a laterally projecting hub fitting within said bearing rings, and bolts attaching said hub to said anchoring ring to hold the wheel in place on the axle.

12. In a motor vehicle, a fixed hollow driving axle, having a differential transmission mechanism in its central portion, in combination with a road wheel having a laterally projecting hollow hub adapted to fit rotatably in the outer end of said axle, a rotary driving shaft adapted to rotatably engage said transmission mechanism at its inner end and the interior of the hub of the driving wheel at its outer end to drive said wheel, and means separate from the shaft for retaining the shaft against removal.

13. In a device of the class described the combination of a rigid hollow axle having an enlarged bearing chamber in its outer end, antifriction wheel bearings in said chamber, a wheel hub mounted in said bearings, a hub-anchoring ring, and detachable means for attaching the hub thereto, said anchoring ring lying back of said bearings and having a doweling flange extending within said bearings to hold the anchoring ring in place coaxically therewith when the hub is removed.

14. In a device of the class described the combination of a rigid hollow axle having an enlarged bearing end with a housing chamber formed therein, a peripheral stop shoulder formed at the inner end of the chamber, antifriction bearings fitting closely within said chamber and abutting against said shoulder, a holding ring screwed into the outer end of the chamber and abutting against the bearings to secure them against the bearings to secure them against the said shoulder, an inwardly projecting flange shoulder at the inner end of the chamber, an anchoring ring abutting against said flange shoulder of said bearings and having a doweling flange extending within the bearings to support it, a wheel hub fitting within said bearings and detachable means for securing the hub to the anchoring ring.

In testimony whereof, I have hereunto set my hand, this 26 day of January, 1912, in the presence of two subscribing witnesses.

RALPH H. ROSENBERG.

Witnesses:
ROBERT H. COCHRAN,
EDWARD F. MCCLOUD.

Copies of this patent may be obtained for five cents each, by addressing the "Commissioner of Patents, Washington, D. C."